Feb. 10, 1959　　　G. C. HOUSWORTH　　　2,872,937
VALVE ASSEMBLY
Filed Feb. 13, 1956　　　　　　　　　　　3 Sheets-Sheet 1

Gordon C. Housworth
INVENTOR.

BY Charles E. Lightfoot
ATTORNEY

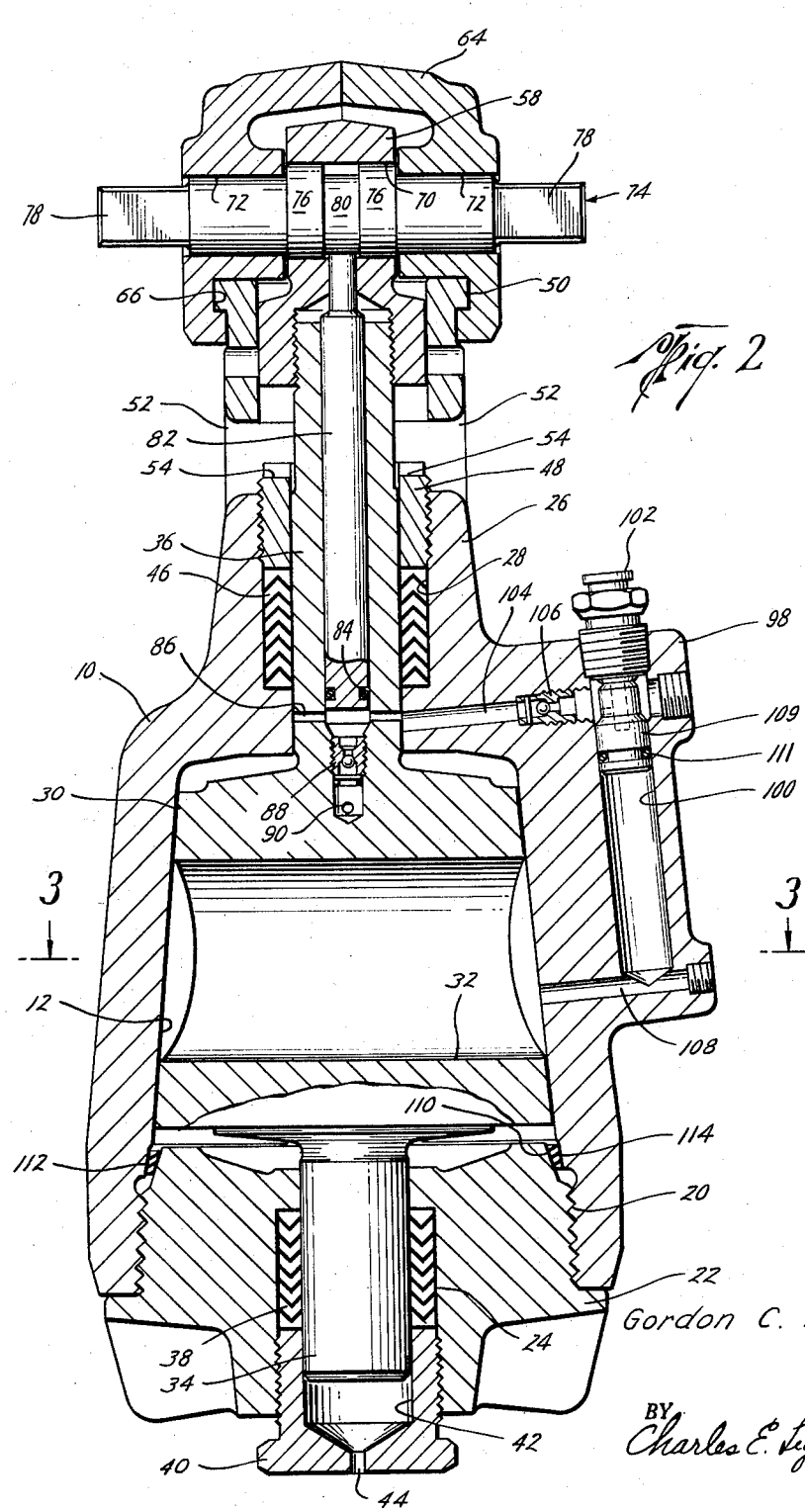

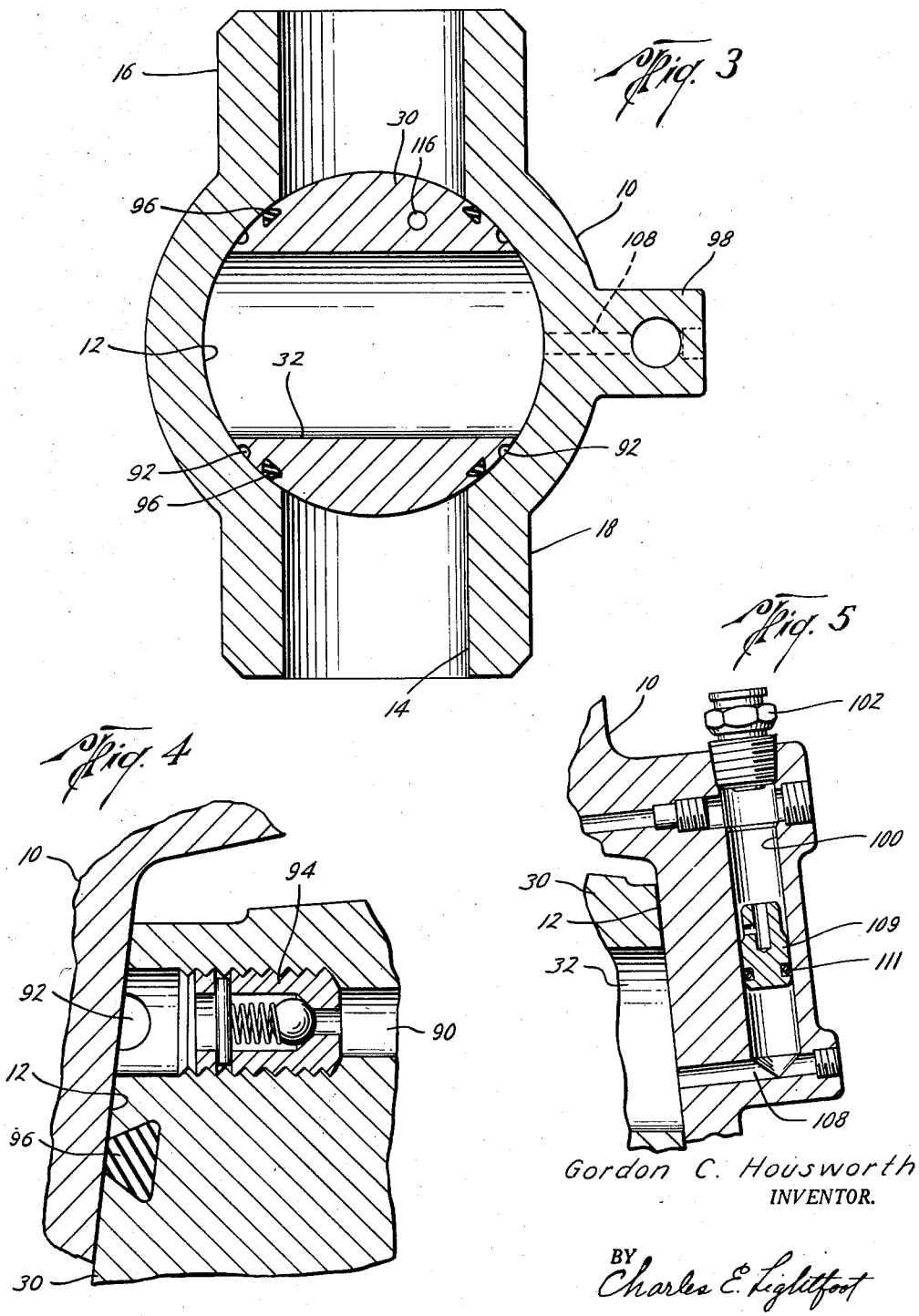

United States Patent Office 2,872,937
Patented Feb. 10, 1959

2,872,937

VALVE ASSEMBLY

Gordon C. Housworth, Houston, Tex., assignor, by direct and mesne assignments, to Russel A. Myers, Houston, Tex.

Application February 13, 1956, Serial No. 565,168

2 Claims. (Cl. 137—246.11)

This invention relates to a valve assembly, and more particularly to a valve of the rotatable plug type embodying improved means for the operation, sealing and lubrication thereof.

In valve assemblies of the rotatable plug type, as heretofore commonly constructed, a valve casing is provided having an internal bore in which a rotatable plug is seated, the plug being in sealing engagement with the seat and being opened and closed while in a seated condition.

Valves constructed and operated in this manner possess a number of serious disadvantages, among which is the rapid wear which takes place between the parts due to the rotation of the plug in contact with the valve seat, making frequent replacement necessary.

It is also difficult to maintain a sealing contact between the plug and seat in valves of this kind, so that, in the absence of some special sealing means, foreign matter such as sand, or the like, often becomes lodged between the seating surfaces, making it necesary to disassemble the valve to remove the same. Moreover, in the event of the development of leakage between the valve and its seat, sealing engagement between the seating surfaces cannot readily be restored without replacement or reconditioning of the valve.

Moreover, when such valves are used to control the flow of a fluid under substantial pressure, the problem of wear on the seating surfaces is greatly increased due to the grinding action caused by abrasive substances entrained in the fluid, which are forced between the parts under the influence of the pressure of the fluid. Under such conditions entrained substances are at times deposited between the parts to an extent to cause sticking or freezing of the valve, in which case the valve must be dismantled before operation can be restored.

The present invention has for an important object the overcoming of the above disadvantages by the provision of a valve assembly of the plug type embodying means for moving the plug into and out of contact with the valve seat, as well as for rotating the plug to open and close the valve.

Another object of the invention is to provide a valve assembly of the rotatable plug type wherein the plug may be moved out of contact with the valve seat before the plug is rotated, so that the seating surfaces are out of contact during opening and closing movements of the valve, whereby wear on the parts is substantially reduced.

A further object of the invention is the provision of a valve assembly of the rotatable plug type having operating mechanism by which the plug may be released from the valve seat in the event of sticking of the valve, and whereby the plug may be moved away from the seat to permit the dislodgement of any foreign matter which may accumulate between the seating surfaces.

Another object of the invention is to provide improved operating mechanism in a rotatable plug valve assembly by which rotation of the plug and movement of the plug toward and away from the seat may be accomplished.

A further object of the invention is the provision of a plug valve assembly having means for maintaining a fluid tight seal between the plug and valve seat and also for lubricating the seating surfaces of the valve.

Another object of the invention is to provide a plug valve assembly in which the plug is movable downwardly to disengage the plug from the valve seat prior to rotation of the plug to open or close the valve, and wherein the plug is movable upwardly into seating contact with the seat when the valve is in closed position.

A further object of the invention is the provision of a plug valve assembly having pressure fluid actuated seal forming means.

Another object of the invention is to provide a plug valve assembly having a plug of the double stem type and which embodies means for equalizing the pressure in the valve casing above and beneath the plug.

A further object of the invention is the provision of a plug valve assembly having operating means therefor which includes pressure fluid responsive means for forming a seal between the plug and valve seat and means for applying pressure to said pressure fluid responsive means when the valve has been moved to closed position.

Another object of the invention is to provide a plug valve assembly having pressure fluid responsive means for forming a seal between the plug and valve seat and including means for applying the pressure in a flow line in which the valve is located to said pressure fluid responsive means when the valve is closed.

A further object of the invention is the provision of a plug valve assembly of the type referred to wherein the moving parts of the valve may be easily assembled or disassembled without disconnecting the valve from the flow line in which it is located.

Other important objects and advantages of the invention may best be understood from the following description, constituting a specification of the same, when considered in conjunction with the annexed drawings, wherein Figure 1 is a vertical, central, cross-sectional view, partly broken away, illustrating one embodiment of the invention and showing the valve plug in closed and seated position;

Figure 2 is a view similar to that of Figure 1 taken at right angles to the plane of the same;

Figure 3 is a cross-sectional view taken along the line 3—3 of Figure 2;

Figure 1:
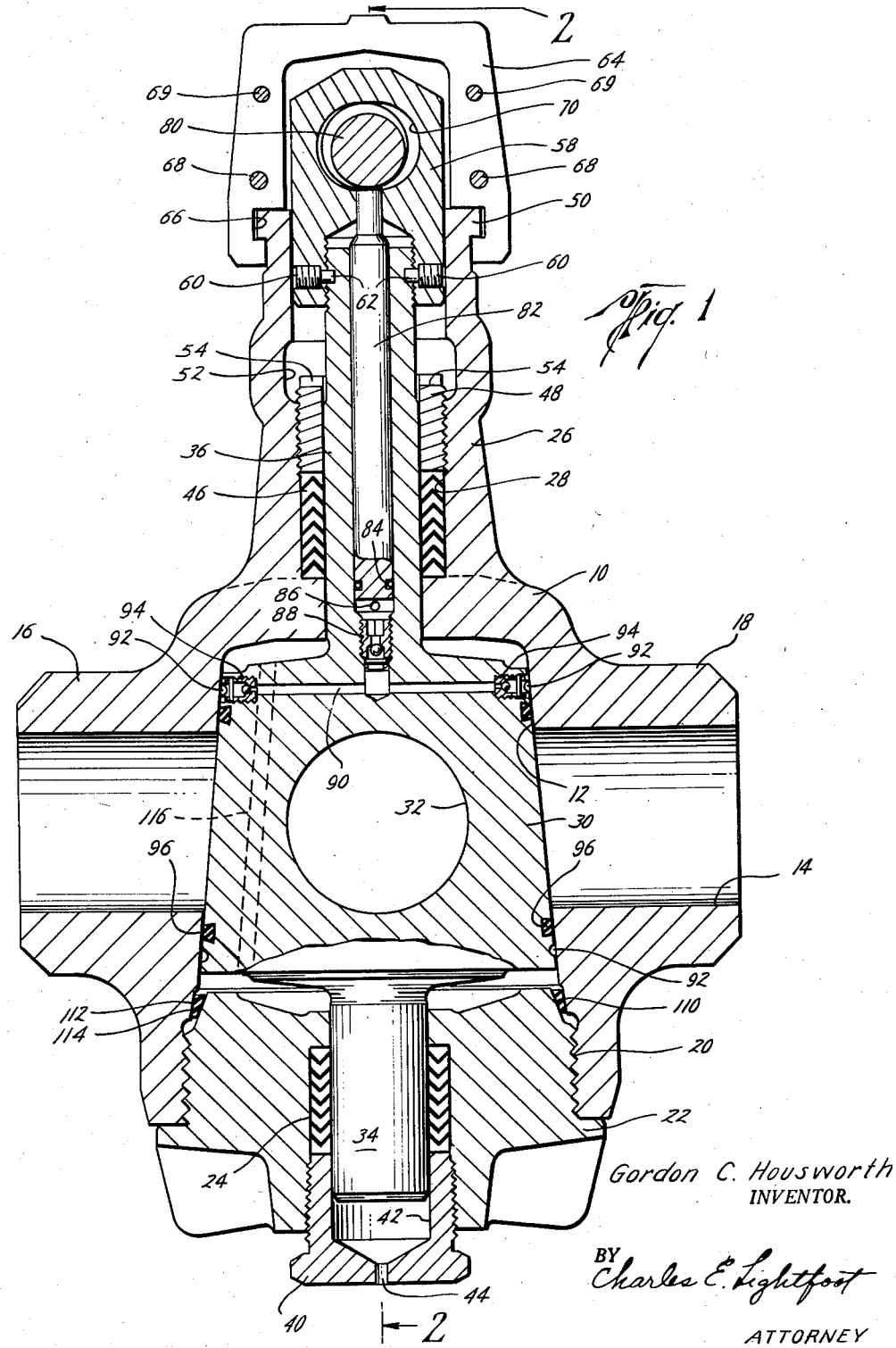

Figure 4 is a fragmentary, cross-sectional view, on an enlarged scale, showing details of construction of a portion of the lubricating and seal forming mechanism of the invention as illustrated in Figure 2; and, Figure 5 is a fragmentary, cross-sectional view, on an enlarged scale, illustrating details of construction of another portion of the lubricating and seal forming mechanism as seen in Figure 2, and showing the means by which fluid under pressure is utilized to assist in the lubrication and sealing of the valve.

Referring now to the drawings in greater detail, the valve assembly of the invention includes a housing or casing 10 having an internal tapering bore 12, which is intersected by a flow way 14. The casing is provided with opposite extensions 16 and 18, which are adapted to be connected in the usual manner to a pipe or conduit, whereby the flow way may be connected in communication with a flow line.

At its lower end the bore 12 is internally threaded, as indicated at 20, for the insertion of an externally threaded removable plug 22, having a central opening therethrough, which is in communication with the interior of the bore, and which leads to the exterior, and which is provided with a downwardly opening counterbore 24, forming a stuffing box.

The casing also has an upwardly extending projection 26, having an opening therethrough, which is in communication with the interior of the bore, and which leads to the exterior, and which is similarly provided with an upwardly opening counterbore 28 forming a stuffing box.

A rotatable valve plug 30 is positioned in the bore 12, which plug has an external surface tapered to conform to the interior tapering surface of the bore, and is provided with a passageway 32, therethrough, which may be moved into and out of alignment with the flow way 14 to open and close the valve. The valve plug 30 has a lower, downwardly projecting, central stem 34, which extends through the central opening of the plug 22, and is also provided with an upper upwardly projecting central tubular stem 36, which extends through the central opening of the projection 26.

Suitable packing, such as that indicated at 38, surrounds the lower stem 34, within the counterbore 24, this packing being adjustably retained in the counterbore by means of a packing nut 40 rotatably inserted in the lower end of the counterbore, and which has an interior bore 42 within which the end of the stem 34 is extended. The packing nut 40 has an opening 44 in communication with the bore 42, and which extends to the exterior. Within the counterbore 28 of the projection 26 suitable packing, such as that indicated at 46 surrounds the upper stem 36, and is adjustably retained in the counterbore by means of a packing nut 48 which is threadably inserted in the upper end of the counterbore 28, and through which the stem 36 extends.

The upper extension or projection 26 is tubular, and is provided at its upper end with an external annular flange 50 and also has side openings 52, located below its upper end, through which a suitable tool may be inserted for the purpose of engaging end slots, such as those indicated at 54 in the upper end of the packing nut 48, whereby the packing nut may be adjusted.

The upper end of the upper stem 36 is externally threaded, to receive a head element 58, whose lower end is slidably fitted into the upper end of the projection 26, and which is secured to the stem 36 by means of set screws 60, whose inner ends fit into external depressions 62 in the stem. A two part hollow cap 64, surrounds the upper end of the projection 26, this cap having an internal annular groove 66 within which the external flange 50 is fitted, to permit the cap to rotate on the projection, the parts, or halves of the cap being suitably secured together, as by means of bolts 68 and 69, extending through horizontally aligned openings in the halves.

The head member 58 extends upwardly above the upper end of the stem 36 into the cap 64, and is provided with an opening 70 therethrough which is positioned in horizontal alignment with somewhat smaller openings 72 provided in each of the halves of the cap 64.

An operating shaft 74 extends through the openings 72 of the cap and through the opening 70 of the head member, and is provided within the opening 70 with spaced cam portions 76, whose external surfaces are eccentrically disposed relative to the axis of the operating shaft. The shaft 74 is provided at its opposite ends with suitably shaped end portions 78, by which the shaft may be rotated, by the application thereto of any convenient means, such as a wrench, or operating lever, the shaft being rotated in the cap which serves as a bearing therefor, whereby the head element 58 and stem 36 will be moved vertically relative to the extension 26 by the cams or eccentrics 76, to raise or lower the valve plug 30 in the valve casing.

Between the eccentrics or cams 76 the shaft 74 has a portion 80 whose external surface is concentric with the axis of the shaft, and with which the upper end of a plunger 82 is engageable, which plunger is movably positioned in the bore of the tubular stem 36. Suitable means, such as an O-ring 84 is provided on the plunger 82, in an external groove provided for that purpose, to form a fluid tight seal between the interior of the stem and the plunger.

The stem 36 has lateral passageways 86, located beneath the lower end of the plunger 82, and which communicate with the interior of the stem, and lead to the exterior thereof in a location within the opening of the projection 26 below the packing 46 and externally of the bore 12 of the casing. Below the passageways 86 a downwardly opening check valve 88 is located in the interior of the stem 36, and below this check valve the valve plug 30 has passageways 90 in communication with the interior of the stem, and which lead to annular external grooves 92 in the valve plug 30, which are positioned to surround the flow way 14 when the valve plug is in closed and seated position in the bore 12. Each of the passageways 90 may be provided with a check valve 94, which opens in a direction to permit the flow of fluid through the passageways toward the grooves 92, and which closes to prevent a back flow of fluid from the grooves through the passageways.

The valve plug 30 is also provided with suitable means, such as the packing rings 96 disposed in external grooves provided therefor, located in surrounding relation to the flow way 14 inwardly of the grooves 92, when the valve plug is in closed and seated position in the bore 12, to prevent the escape of fluid from the grooves 92 into the flow way.

The casing 10 is also provided with an external projecting portion 98, having a bore 100 opening to the exterior at its upper end, and which is internally threaded to receive a lubricant fitting 102 of conventional construction, of the type having an inwardly opening check valve, not shown, through which a sealing and lubricating composition may be introduced under pressure into the bore 100. The casing also has a passageway 104, in communication with the bore 100 near the upper end of the bore, and which leads to the opening through which the stem 36 passes upwardly at a location to permit the passageways 86 of the stem 36 to be moved into communication with the passageway 104 when the valve plug 30 is in closed position, and a check valve 106 is located in the passageway 104 in position to close the passageway against the back flow of fluid therethrough into the bore 100, but which opens to permit the flow of fluid from the bore 100 through the passageway.

The casing also has a passageway 108 in communication with the lower end of the bore 100, and which leads into the interior of the bore 12, at a point to be in communication with the passageway 32 of the valve plug 30, when the valve is in closed position.

A piston 109 is movably positioned in the bore 100, and is provided with a suitable packing, such as an O-ring 111 disposed in an external groove in the piston provided for that purpose and which forms a fluid tight seal between the piston and the interior of the bore.

The distance between the inner end of the bottom plug 22 and the inner end of the bore 12 is substantially greater than the length of the valve plug 30, so that the valve plug may be moved vertically in the bore to seat or unseat the valve plug. At its inner end the bottom plug 22 is provided with an external, annular, tapering surface 110, and the bore 12 is provided with a similar tapered surface 112, positioned opposite the surface 110; suitable packing means, such as the resilient ring 114 being positioned between the surfaces, to form a fluid tight seal between the casing and bottom plug. The plug 30 is also provided with a through passageway 116, which extends through the plug from end to end thereof.

In assembling the valve, constructed as described above, the piston 109 is inserted in the bore 100 through the upper end thereof, and the fitting 102 is screwed in place. The valve plug 30, with the plunger 82 inserted in the tubular stem 36 is inserted in the bore 12 through the bottom opening of the casing, the stem 36 extending upwardly in the extension 26 through the packing 46 and packing nut 48.

The head element 70 is then attached to the upper end of the stem 36 by threading the stem into the head element, and the valve plug with the head element attached is lowered to move the head element to a position in which the set screws 60 may be inserted through the openings 52 of the extension 26, and tightened to hold the head element and stem against relative rotation. The bottom plug 22 is screwed in position with the lower stem 34 extending through the central opening therein and the packing 38 is inserted in the counterbore 24 and the packing nut 40 is screwed in place to tighten the packing; the seal ring 14 being positioned on the tapering surface 110 to form a fluid tight seal between the bottom plug and the bore. The upper packing nut 48 may be tightened by the use of a suitable tool inserted through the openings 52, to tighten the upper packing 46. The operating shaft 74 may then be inserted through the opening 70 of the head element 58, and the halves of the split cap 64 may then be assembled on the operating shaft, the upper end flange 50 of the extension 26 extending into the annular groove 66 of the cap, to rotatably secure the cap to the casing, and the operating shaft being rotatably carried by the cap in the openings 72 thereof.

A suitable lubricating and seal forming composition, may then be introduced under pressure into the bore 100, through the fitting 102, to move the piston 109 downwardly therein, and to fill the passageways 104, 86, 90, and the external grooves 92, to form a fluid tight seal between the valve plug 30 and the interior of the bore 12, when the valve is in closed and seated position. Upon such introduction of the lubricating and sealing composition into the bore 100, the composition may also flow into the tubular extension 26, beneath the plunger 82, so that upon upward movement of the stem 36 to seat the valve plug in closing position, pressure will be applied to the composition by the plunger 82.

In operating the valve, assuming that the same is in closed and seated position, as illustrated in Figures 1 and 2, the operating shaft 74 is rotated in the cap 64, the cams or eccentrics 76 being thus actuated to lift the head element 58 to move the stem 36 downwardly, to unseat the valve plug 30, whereupon the valve plug may be rotated by rotation of the cap 64 to move the valve to open position, without rotation of the valve plug in contact with its seat. The valve plug may then be again moved into seated position by further rotation of the operating shaft 74, if desired.

To close the valve the operating shaft 74 may be rotated to move the valve plug downwardly, to unseat the plug, whereupon the plug may be rotated by rotation of the cap 64 to closing position, and the operating shaft may again be rotated to move the valve plug into sealing contact with its seat. When the valve plug is in closed and seated position, the external grooves 92 will be in communication with the bore 100 through passageways 104, 86, and 90, to permit the flow of lubricating and sealing composition from the bore 100 to the grooves, to maintain the grooves constantly filled with the composition. It will also be apparent that upon actuation of the operating shaft 74, with the valve plug in closed and seated position, the valve plug will be moved downwardly to unseat the same, whereupon the composition may flow from the bore 100 through the passageways to the grooves 92, to keep the grooves filled with the composition. At the same time that the valve plug is thus unseated, the stem 36 will move downwardly relative to the plunger 82, so that a supply of the composition will be provided in the interior of the stem beneath the plunger 82, and when the valve plug is again moved to seated position additional pressure will be applied by the plunger to the composition in the tubular stem beneath the plunger to force the composition into the grooves 92 to provide a tight seal when the valve plug is seated.

Moreover, when the valve plug is unseated in its closed position pressure in the flow way 14 may enter the passageway 108 to apply pressure to the bore 100 beneath the piston 109, thus causing the composition to flow through passageways 104, 86 and 90 to the grooves 92, but when the valve is in open position, the passageways 86 will be out of communication with passageway 104, so that the composition cannot flow from bore 100 to the grooves 92. Thus the composition is only supplied to the grooves while the valve is in closed position, so that there is no unnecessary loss of the composition, but at the same time an effective seal is maintained between the valve plug and its seat.

It will thus be seen that the invention, constructed in the manner described above, provides a valve assembly which is easily assembled and disassembled, and in which an effective seal is maintained between the parts, while at the same time means is provided for maintaining the parts out of seating contact during opening and closing movements of the valve.

The invention has been disclosed herein in connection with a specific embodiment of the same, but it will be understood that this is intended by way of illustration only, and that numerous changes can be made in the construction and arrangement of the various parts, without departing from the spirit of the invention or the scope of the appended claims.

Having thus clearly shown and described the invention, what is claimed as new and desired to secure by Letters Patent is:

1. A valve assembly comprising a valve casing having a flowway therethrough and an internal bore intersecting said flowway and forming a valve seat, a valve in the bore whose length is less than the depth of said bore and having a passageway therethrough, said valve being rotatable to move said passageway into and out of alignment with said flowway and also being movable longitudinally in the bore into and out of seating engagement with said seat, said valve having an external, annular, lubricant receiving groove surrounding said passageway and positioned to be closed by said seat when the valve is seated, a tubular stem on the valve rotatably extended through the casing, a plunger movably positioned in the stem, said valve having a passageway in communication with said groove and with the interior of the stem beneath the plunger, means for introducing a lubricant into said stem beneath the plunger, means on the casing for actuating said stem to move said valve longitudinally and positioned for coaction with the casing and said plunger to hold the plunger against longitudinal movement in the direction of stem movement upon seating movement of the valve.

2. A valve assembly comprising a valve casing having a flowway therethrough and an internal bore intersecting said flowway and forming a valve seat, a valve in the bore whose length is less than the depth of said bore and having a passageway therethrough, said valve being rotatable to move said passageway into and out of alignment with said flowway and also being movable longitudinally in the bore into and out of seating engagement with said seat, said valve having an external, annular, lubricant receiving groove surrounding said passageway and positioned to be closed by said seat when the valve is seated, a tubular stem on the valve rotatably extended through the casing, a plunger movably positioned in the stem, said valve having a passageway in communication with said groove and with the interior of the stem beneath the plunger, a reservoir in the casing, said valve having a lubricant passageway in communication with said reservoir and the interior of said stem beneath said plunger when the valve is closed, means for closing said lubricant passageway when the valve is opened, means on the casing for actuating said stem to move said valve longitudinally and positioned for coaction with the casing and said plunger to hold the plunger against longitudinal movement in the direction of stem movement upon seating movement of the valve.

(References on following page)

References Cited in the file of this patent

UNITED STATES PATENTS

| | | |
|---|---|---|
| 1,534,866 | Page | Apr. 21, 1925 |
| 2,214,324 | Goldberg | Sept. 10, 1940 |
| 2,281,697 | Kerr | May 5, 1942 |
| 2,354,864 | Kerr | Aug. 1, 1944 |
| 2,606,737 | Tratzik | Aug. 12, 1952 |
| 2,707,613 | Wheatley | May 3, 1955 |
| 2,715,838 | Allen | Aug. 23, 1955 |
| 2,738,799 | Mueller | Mar. 20, 1956 |
| 2,767,729 | Mueller | Oct. 23, 1956 |